United States Patent [19]

Peterson

[11] 4,047,080
[45] Sept. 6, 1977

[54] COMMON BUS PARALLEL SPEED REGULATOR SYSTEM

[75] Inventor: Robert S. Peterson, Williamsville, N.Y.

[73] Assignee: Westinghouse Electric Corporation, Pittsburgh, Pa.

[21] Appl. No.: 685,463

[22] Filed: May 12, 1976

[51] Int. Cl.² ............................................. H02P 5/16
[52] U.S. Cl. ....................................... 318/79; 318/92; 318/338; 318/493
[58] Field of Search ................... 318/338, 79, 92, 493, 318/336

[56] References Cited

U.S. PATENT DOCUMENTS

| | | | |
|---|---|---|---|
| 3,599,064 | 8/1971 | Friedman | 318/338 |
| 3,950,684 | 4/1976 | Peterson | 318/338 |
| 3,962,612 | 6/1976 | Kawasaki | 318/338 X |
| 3,983,466 | 9/1976 | Safiuddin | 318/338 |

Primary Examiner—B. Dobeck
Attorney, Agent, or Firm—James J. Wood

[57] ABSTRACT

This disclosure relates to a parallel speed regulator system for a plurality of d.c. motors operated on a common bus having a single armature electrical supply. The speed control, current limiting, and field current controllers for each motor are arranged in parallel and connected to a resistor-diode switching network to provide a switching order of priority: (1) maximum and minimum field current controllers (2) armature current limit controllers and (3) speed controller. This parallel speed regulator system provides all the inherent advantages of the multiloop controller arrangement together with automatic adjustments which are a function of the instantaneous motor operating point, so that the dynamic response of the motor remains the same regardless of perturbations in the operating points.

5 Claims, 9 Drawing Figures $$\frac{\Delta V_f}{\Delta I_a} = \frac{[(R_2+R_3)C_2S+1](R_1C_1S+1)}{\alpha(\omega_{CL})C_1R_T(.005S+1)^3} ; \text{ARM. CURR. LIMIT CONT. TRANSFER FUNCTION}$$

$$\frac{\Delta V_f}{\Delta i_f} = \frac{R_1(C_1+C_2)S+1}{\alpha R_3 C_1 S(\beta C_2 R_1 S+1)} ; \text{FIELD CURRENT CONT. TRANSFER FUNCTION}$$

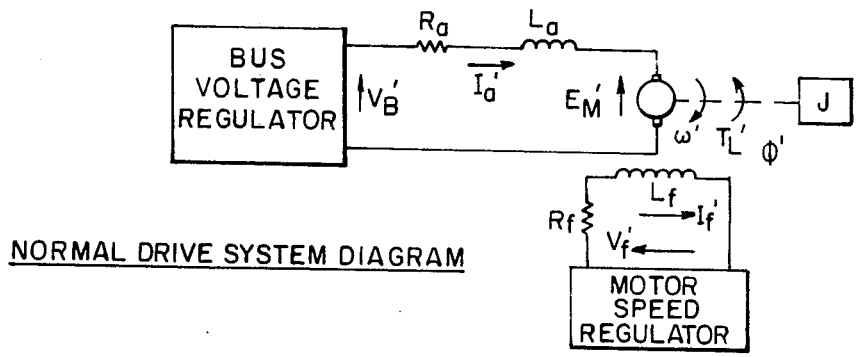

NORMAL DRIVE SYSTEM DIAGRAM

FIG. 7

DEFINITION OF VARIABLES $V_B'$ = MTR. TERM VOLTAGE, VOLTS
$I_a'$ = MTR. ARM. CURRENT, AMPS
$T_M'$ = MTR. TORQUE, #FT.
$\omega'$ = MTR. SPEED, RAD./SEC.
$T_L'$ = MTR. STATIC LOAD TORQUE, #FT.
$\phi'$ = MTR. FIELD FLUX, KAPLINES
$I_f'$ = MTR. FIELD CURRENT, AMPS
$V_f'$ = MTR. FIELD VOLTAGE, VOLTS

ASSUME $\phi = K_\phi I_f'$ (NO SATURATION)

DEFINITION OF PARAMETERS $R_a$ = ARM. CIRCUIT RESISTANCE, OHMS
$L_a$ = ARM. CIRCUIT INDUCTANCE, HENRIES
$K_\omega$ = MOTOR VOLT. CONSTANT, VOLTS/((RAD./SEC.) × KAPLINES)
$J$ = TOTAL SYSTEM INERTIA, SLUG × FT.$^2$
$K_T$ = MOTOR TORQUE CONSTANT, #FT./(KAPLINE AMPERE)
$R_f$ = MOTOR FIELD RESISTANCE, OHMS
$L_f$ = MOTOR FIELD INDUCTANCE, HENRIES
$K_\phi$ = MOTOR FLUX CONSTANT, KAPLINE/AMP.

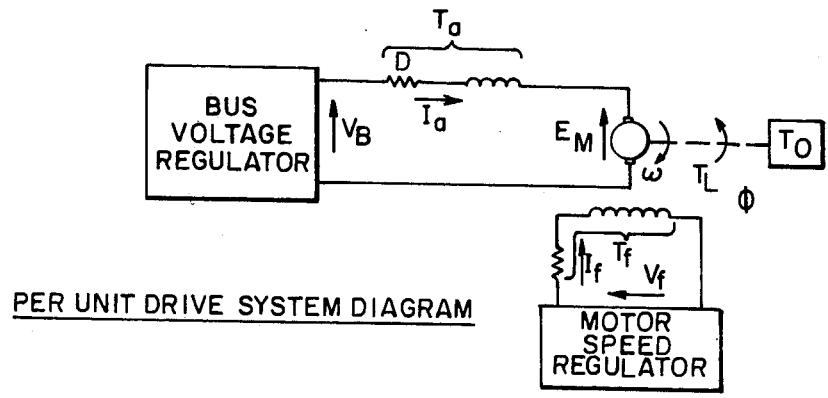

PER UNIT DRIVE SYSTEM DIAGRAM

FIG. 8

INTERPRETATION OF BLOCK

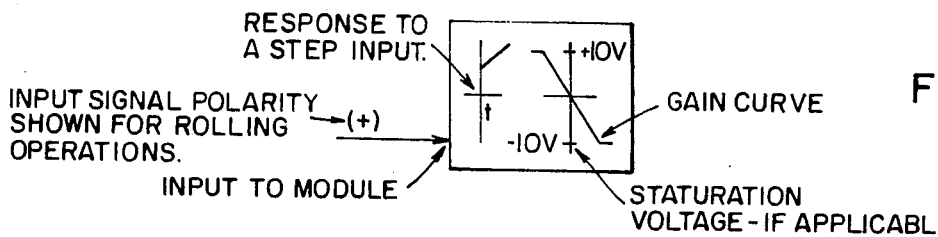

COMMON BUS PARALLEL SPEED REGULATOR SYSTEM

BACKGROUND OF THE INVENTION

1. Field of the Invention

This invention relates to a parallel speed regulator system for controlling the field excitation of a motor operated from a common bus electrical supply.

2. Description of the Prior Art

In bar, rod, and stretch mills, the mill motors are frequently operated on a common bus system, with many drive motors arranged on a single armature supply. In most prior art systems, speed regulation is accomplished by controlling motor field excitation by means of a multiloop arrangement comprising an inner field current loop, an armature current loop, and an outside speed loop. The principal reason for utilizing the multiloop system is to enable the inner feedback loops to linearize the regulating system. When a regulating system controls motor field excitation the results are inherently non-linear because the gain coefficients and time constants of the motor and load vary with the operating point of the motor. The non-linearities are the result of controlling field flux where motor torque is a function of field flux and armature current, and speed is a function of back emf divided by field flux. With the advent of static multipliers and dividers, it is now possible to provide both gain and time constant compensation which vary with the operating point of the regulator controllers. By using this technique it is possible to linearize the regulator feedback loop so that the system has the same dynamic response at all operating points.

As of this date there does not appear to be any successful parallel speed regulator operating on a common bus speed regulated drive system. The parallel speed regulator has several advantages over the prior art multiloop speed regulators. In the first place, the parallel system is faster, has less speed droop, and a smaller percentage speed error times seconds for a step impact load condition. This parallel system can be less sensitive to noise from tachometers and the like. Inherently there is no possibility of controller windup.

The present invention provides successful parallel speed regulator with all the inherent advantages vis-a-vis the multiloop control, together with compensation which varies as a function of the instantaneous operating point of the motor, so that the dynamics of the speed regulator remain the same regardless of shifts in operating point.

SUMMARY OF THE INVENTION

A speed regulation system for a d.c. motor is claimed in which the motor is operated as one of a plurality of such motors from a common voltage bus. Field exciter means are provided for controlling the voltage supplied to the field of said motor. A speed regulation controller, having a linearized transfer function, is connected to receive a motor speed signal $-\omega$ and a motor speed reference signal $\omega^*$, and to deliver a speed control signal $-V_m$. An armature current limit controller, having a linearized transfer function, is connected to receive an armature current signal $+\Delta I_a$, and armature current reference signals $\pm I_{a^*}$, and to deliver an armature current control signal $\pm V_{C.L.}$. Switching means are provided for determining priority among said controllers, the controllers being connected in parallel to said switching means. The switching means delivers an output signal $-\Delta V_f$ to said field exciter means which is a function of the output of one selected controller based on the order of priority: (1) field current controller (2) armature current limit controller (3) speed controller.

BRIEF DESCRIPTION OF THE DRAWINGS

FIG. 7 is a diagram utilized in deriving the mathematics of the invention;

FIG. 8 is a similar diagram utilized in deriving the mathematics of the invention; and FIG. 9 is a diagram depicting the meaning of the symbols used for the various function blocks.

GENERAL MATHEMATICAL ANALYSIS

Figure 1:
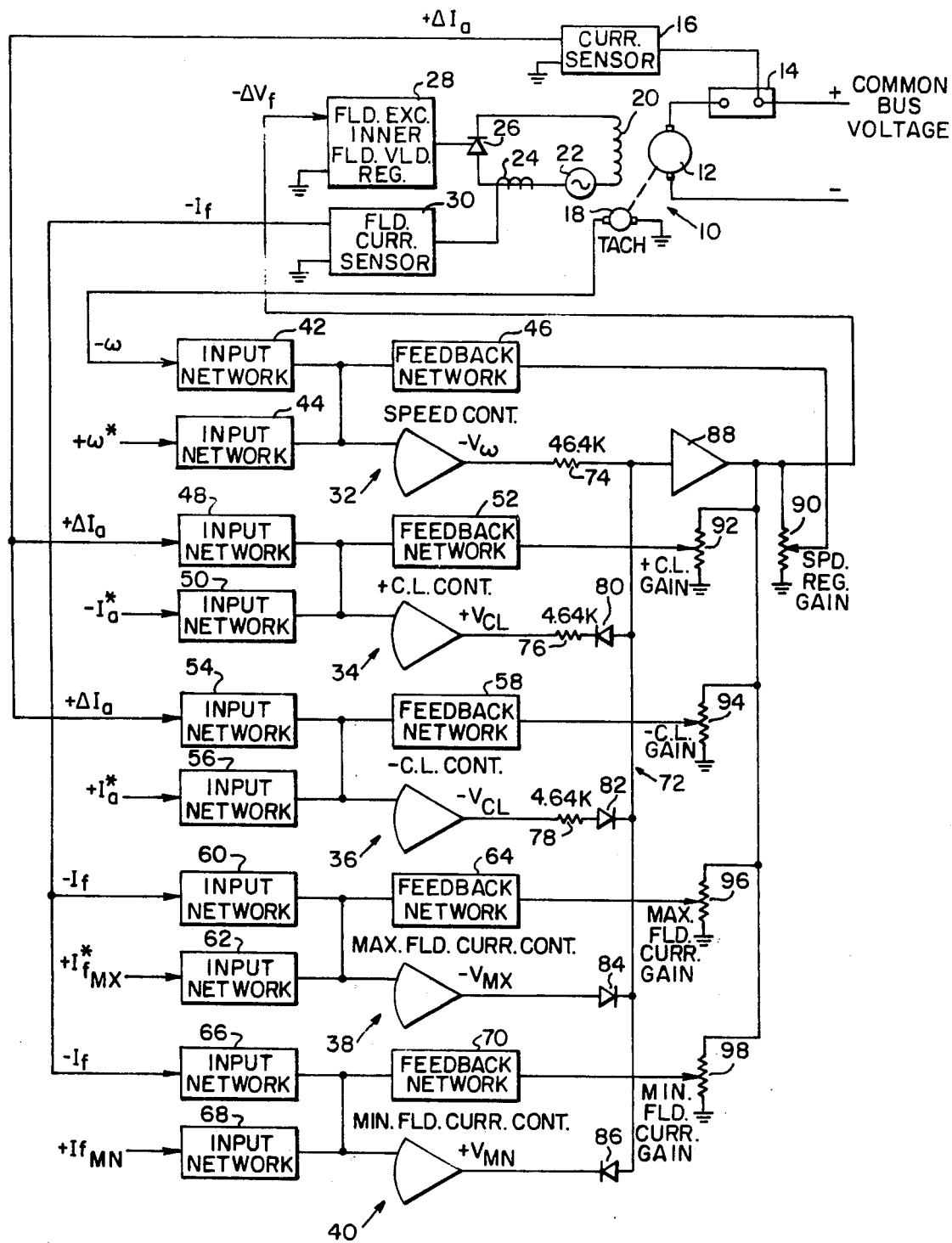
FIG. 1 is a block schematic diagram depicting the common bus parallel speed regulator system in accordance with the invention.

Before describing the invention in detail it is necessary to mathematically define a linear transfer function relating the motor field voltage and the motor speed, and in the case of the armature current limit controller it is necessary to mathematically define a linear transfer function relating the motor field voltage and the motor armature current.

Referring to FIG. 7, the following system differential equations may be written:
For the armature circuit $$V_B{}' = I_a{}'(R_a) + L_a \frac{dI_a{}'}{dt} + K_\omega \omega' \phi' \quad (1)$$

For the motor torque $$T_m{}' = K_T \phi' I_a{}' = T_L{}' + \frac{J d(\omega')}{dt} \quad (2)$$

For the field circuit $$V_f{}' = I_f{}' R_f + L_f \frac{d(I_f)}{dt} \quad (3)$$

Let the motor have the following rated magnitudes:
$V_{BR}$ = motor rated terminal voltage (volts)
$I_{aR}$ = motor rated armature current (amps)
$\phi_R$ = motor rated field flux (lines)
$\omega_{NL}$ = motor no load speed at rated motor terminal voltage $V_{BR}$ and rated motor field flux $\phi_R$; (rad/sec)
$T_{mR}$ = motor rated torque (lb ft)
$I_{fR}$ = motor rated field current (amps)
$V_{fR}$ = motor rated field voltage (volts)
By definition:

$$V_{BR} = K_\omega \phi_R \omega_{NL} \quad (4)$$

$$T_{mR} = K_T \phi_R I_{aR} \quad (5)$$

$$V_{fR} = I_{fR} R_f \quad (6)$$

The following per unit (P.U.) magnitudes are defined as follows:

$$V_B = (V_B'/V_{BR}) = \text{motor terminal voltage P.U.} \quad (7)$$

$$I_a = (I_a'/I_{aR}) = \text{motor armature current P.U.} \quad (8)$$

$$\omega = (\omega'/\omega_{NL}) = \text{motor speed P.U.} \quad (9)$$

$$\phi = (\phi'/\phi_R) = \text{motor field flux P.U.} \quad (10)$$

$$T_m = (T_m'/T_{mR}) = \text{motor torque P.U.} \quad (11)$$

$$T_L = (T_L'/T_{mR}) = \text{motor static load torque P.U.} \quad (12)$$

$$I_f = (I_f'/I_{fR}) = \text{motor field current P.U.} \quad (13)$$

$$V_f = (V_f'/V_{fR}) = \text{motor field voltage P.U.} \quad (14)$$
$$D = (I_{aR}R_a/V_{BR}) = \text{armature circuit droop P.U.} \quad (15)$$

The following time constants are defined:

$$T_a = (L_a/R_a) = \text{armature circuit time constant (secs)} \quad (16)$$

$$T_f = (L_f/R_f) = \text{motor field time constant (secs)} \quad (17)$$

$$T_0 = \frac{JR_a}{\left(\frac{V_{BR}}{\omega_{NL}}\right)\left(\frac{T_{mR}}{I_{aR}}\right)} = \text{mechanical time constant (secs)} \quad (18)$$

Derivation of drive system P.U. equations.

From equation (1), dividing both sides of the equation by $V_{BR}$ and rearranging terms.

$$\frac{V_B'}{V_{BR}} = \quad (19)$$

$$\frac{I_a'}{I_{aR}}\left(\frac{I_{aR}R_a}{V_{BR}}\right) + \frac{L_a I_{aR}}{V_{BR}} \frac{d\left(\frac{I_a'}{I_{aR}}\right)}{dt} + \left[\frac{K_\omega \omega_{NL} \phi_R}{V_{BR}}\right]\left(\frac{\omega'}{\omega_{NL}}\right)\left(\frac{\phi'}{\phi_R}\right)$$

$$\frac{V_B'}{V_{BR}} = \quad (20)$$

$$\frac{I_{aR}R_a}{V_{BR}}\left[\frac{I_a'}{I_{aR}} + \left(\frac{L_a I_{aR} V_{BR}}{V_{BR} I_{aR} R_a}\right)\frac{d\left(\frac{I_a'}{I_{aR}}\right)}{dt}\right] + \frac{K_\omega \omega_{NL} \phi_R}{V_{BR}}\left(\frac{\omega'}{\omega_{NL}}\right)\left(\frac{\phi'}{\phi_R}\right)$$

From P.U. definitions $$V_B = D\left[I_a + T_a \frac{d(I_a)}{dt}\right] + \omega\phi \quad (21)$$

Let $s$ = Laplace operator 1/sec. then (21) becomes:

$$V_B = I_a D[1 + T_a s] + \omega\phi \text{ (per unit equation)} \quad (22)$$

From equation (2) dividing both sides of the equation by $T_{mR}$ and rearranging terms $$\frac{T_m'}{T_{mR}} = \quad (23)$$

$$\frac{T_L'}{T_{mR}} + \frac{J\omega_{NL}}{T_{mR}} \frac{d\left(\frac{\omega}{\omega_{NL}}\right)}{dt} = \left[\frac{K_T \phi_R I_{aR}}{T_{mR}}\right]\left(\frac{\phi'}{\phi_R}\right)\left(\frac{I_a'}{I_{aR}}\right)$$

$$J\omega_{NL}/T_{mR} \text{ may be written as}$$

$$\frac{J\omega_{NL}}{T_{mR}} = \frac{JR_a \omega_{NL} I_{aR}}{V_{BR} T_{mR}}\left(\frac{V_{BR}}{I_{aR} R_a}\right) \quad (24)$$

From the definition of $T_o$ equation (18) and recognizing $1/D = V_{BR}/I_{aR}R_a$ $$\frac{J\omega_{NL}}{T_{mR}} = \frac{T_o}{D} \text{ and } T_{mR} = K_T \phi_R I_{aR} \quad (25)$$

then equation (23) becomes:

$$\frac{T_m'}{T_{mR}} = \quad (26)$$

$$\frac{T_L'}{T_{mR}} + \left(\frac{T_o}{D}\right)\frac{d\left(\frac{\omega}{\omega_{NL}}\right)}{dt} = \left(\frac{\phi'}{\phi_R}\right)\left(\frac{I_a'}{I_{aR}}\right)$$

$$T_m = T_L + (T_o/D) d(\omega)/dt = \phi I_a \quad (27)$$

Using the Laplace operator $T_m = \phi I_a = T_L + T_o/D$ $s\omega$ (per unit equation) (28)

From equation (3) dividing both sides of the equation by $V_{fR}$ and rearranging terms.

$$\frac{V_f'}{V_{fR}} = \frac{I_f'}{I_{fR}}\left(\frac{I_{fR}R_f}{V_{fR}}\right) + \frac{L_f I_{fR}}{V_{fR}} \frac{d\left(\frac{I_f'}{I_{fR}}\right)}{dt} \quad (29)$$

Since $V_{fR} = I_{fR}R_f$ and $T_f = L_f/R_f$ $$\frac{V_f}{V_{fR}} = \frac{I_{fR}R_f}{V_{sR}} \left[ \frac{I_f}{I_{fR}} + \frac{L_f I_{fR} R_f}{R_f V_{fR}} \frac{d\left(\frac{I_f}{I_{fR}}\right)}{dt} \right] \quad (30)$$

$$V_f = I_f + T_f \frac{dI_f}{dt} \quad (31)$$

Using the Laplace operator $s$ $$V_f = I_f(1 + T_f s) \text{ (per unit equation) } (32)$$

Referring now to FIG. 8, the per unit equations are repeated for convenience.

$$V_B = I_a D [T + T_a s] + \omega \phi \quad (22)$$

$$T_m = \phi I_a = T_L + (T_a/D) s\omega \quad (28)$$

$$V_f = I_f(1 + T_f s) \quad (32)$$

Using the perturbation method to determine linear transfer functions connecting $\Delta V_f$, $\Delta \phi$, $\Delta I_a$ and $\Delta \omega$, let $$\phi = \phi_o + \Delta \phi \quad (33)$$

$$I_a = I_{ao} + \Delta I_a \quad (34)$$

$$\omega = \omega_o + \Delta \omega \quad (35)$$

$$V_B = V_{Bo} + \Delta V_B \quad (36)$$

$$T_L = T_{Lo} + \Delta T_L \quad (37)$$

$$T_m = T_{mo} + \Delta T_m \quad (38)$$

$$V_f = V_{fo} + \Delta V_f \quad (39)$$

$$I_f = I_{fo} + \Delta I_f \quad (40)$$

where the subscript $o$ denotes the operating level and $\Delta$ denotes a variable perturbation about the operating level $$E_m = \phi \times \omega = (\phi_o + \Delta \phi)(\omega_o + \Delta \omega) = \phi_o \omega_o + \phi_o \Delta \omega + \omega_o \Delta \phi + \Delta \phi \Delta \omega \quad (41)$$

discarding negligible terms $$E_m = \phi_o \omega_o + \phi_o \Delta \omega + \omega_o \Delta \phi \quad (42)$$

$$T_m = I_a \times \phi = (I_{ao} + \Delta I_a)(\phi_o + \Delta \phi) = I_{ao}\phi_o + I_{ao}\Delta \phi + \phi_o \Delta I_a + \Delta I_a \Delta \phi \quad (43)$$

discarding negligible terms $$T_m = I_{ao}\phi_o + I_{ao}\Delta \phi + \phi_o \Delta I_a \quad (44)$$

solving equations (22) for $I_a$ $$I_a = \left[\frac{1}{D(1 + T_a s)}\right](V_B - \omega \phi) \quad (45)$$

Using perturbation equations in equation (45)

$$I_{ao} + \Delta I_a = \left[\frac{1}{D(1 + T_a s)}\right][V_{Bo} + \Delta V_B - \phi_o \omega_o - \phi_o \Delta \omega - \omega_o \Delta \phi] \quad (46)$$

Solving equation (28) for $\omega$ $$\omega = \frac{D}{T_a s}[T_m - T_L] \quad (47)$$

Using the perturbation equations in equation (47)

$$\omega_o + \Delta \omega = \left(\frac{D}{T_a s}\right)[T_{mo} + \Delta T_m - T_{Lo} - \Delta T_L] \quad (48)$$

By perturbation theory $$I_{ao} = \left[\frac{1}{D(1 + T_a s)}\right][V_{Bo} - \phi_o \omega_o]; \text{ and} \quad (49)$$

$$\omega_o = \frac{D}{T_a s}[T_{mo} - T_{Lo}] \quad (50)$$

$$\therefore \Delta I_a = \left[\frac{1}{D(1 + T_a s)}\right][\Delta V_B - \phi_o \Delta \omega - \omega_o \Delta \phi]; \text{ and} \quad (51)$$

$$\Delta \omega = \left[\frac{D}{T_a s}\right][\Delta T_m - \Delta T_L] \quad (52)$$

$$= \left[\frac{D}{T_a s}\right](I_{ao}\Delta \phi + \phi_o \Delta I_a - \Delta T_L)$$

From equation 32

$$I_f = \frac{V_f}{1 + T_f s} \quad (53)$$

Using perturbation $$I_{fo} + \Delta I_f = \frac{1}{1 + T_f s}[V_{fo} + \Delta V_f] \quad (54)$$

$$I_{fo} = \frac{1}{1 + T_f s}[V_{fo}] \quad (55)$$

$$\Delta I_f = \left(\frac{1}{1 + T_f s}\right)\Delta V_f \quad (56)$$

$$I_f = \phi \quad (57)$$

$$\Delta I_f = \Delta \phi \quad (58)$$

A signal flow diagram will not be derived from the relationships of equations (51), (52), and (56)

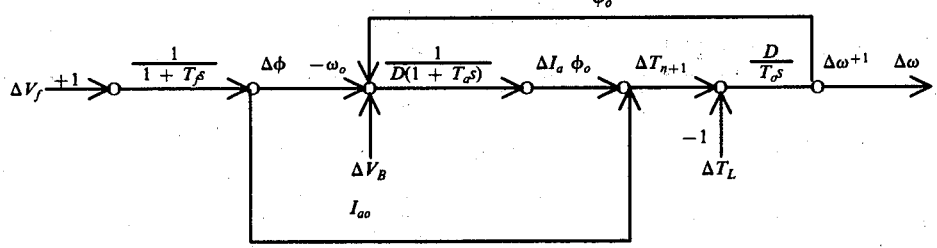

Neglecting Bus voltage distrubance and load distrubance $\Delta T_L$ (60)

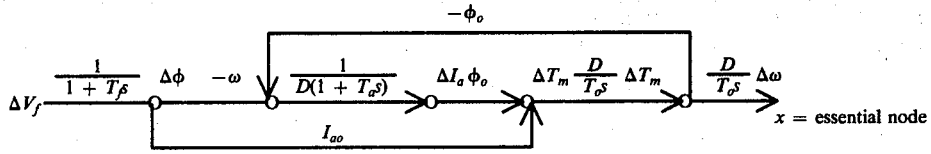

Obtain transfer function $\frac{\Delta\omega}{\Delta V_f}$ (61)

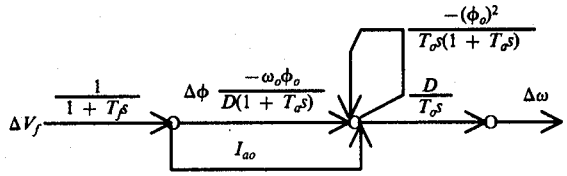

(62)

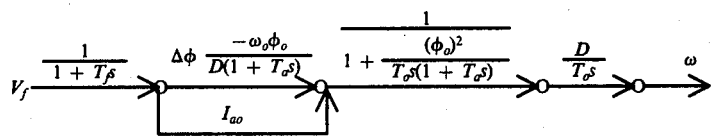

(63)

since, $\frac{-\omega_0\phi_o}{D(1+T_a s)} + I_{ao} = \frac{-\omega_o\phi_o + I_{ao}D(1+T_a s)}{D(1+T_a s)}$ and (64)

$$\frac{1}{1 + \frac{(\phi_o)^2}{T_o s(1+T_a s)}} = \frac{T_o s(1+T_a s)}{T_o s(1+T_a s)+(\phi_o)^2} = \frac{\frac{T_o s}{(\phi_o)^2}(1+T_a s)}{\frac{T_o}{(\phi_o)^2}T_a s^2 + \frac{T_o}{(\phi_o)^2}s + 1}$$

(65)

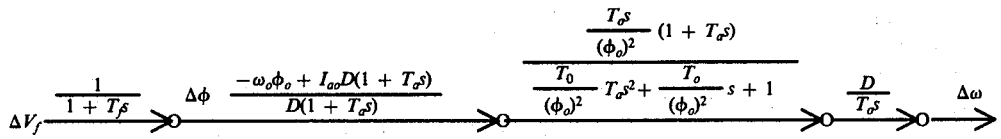

(66)

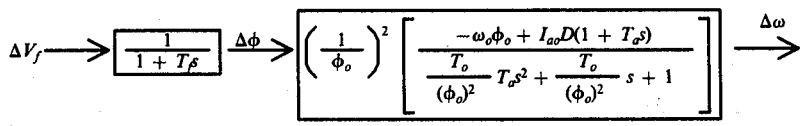

Since:
$V_B = \omega\phi + I_a D(1+T_a s)$ (67)

$-V_B + 2I_a(D)(1+T_a s) = -\omega\phi - I_a D(1+T_a S) + 2I_a(D)(1+T_a s)$ (68)

$-V_B + 2I_a(D)(1+T_a s) = -\omega\phi + I_a D(1+T_a s)$ (69)

(70)

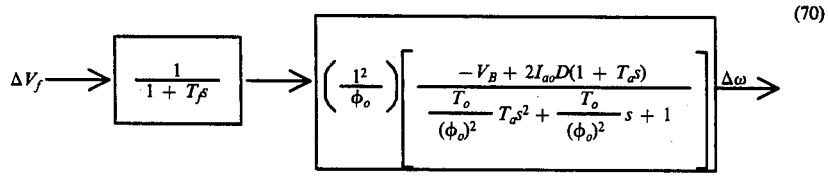

This is a linear block diagram relating motor field voltage to motor field flux to motor speed.

Obtain transfer function $I_a/V_f$

This is the linearized block diagram relating motor field voltage to motor field flux to motor speed.

(76) Can be further simplified by neglecting $-I_{ao}\phi_o$ (59)

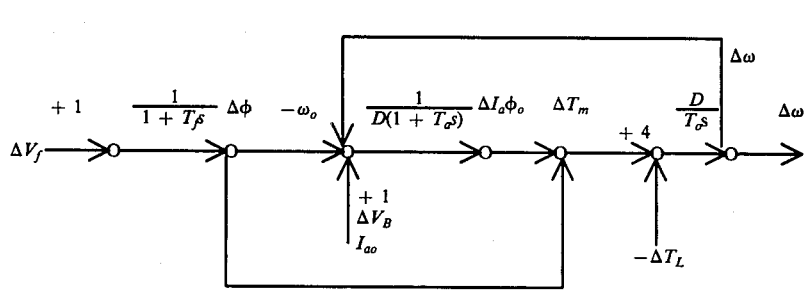

Neglecting Bus voltage disturbance $\Delta V_B$ and load disturbance $\Delta T_L$.

which is small, and cancelling similar terms.

(77)

(71)

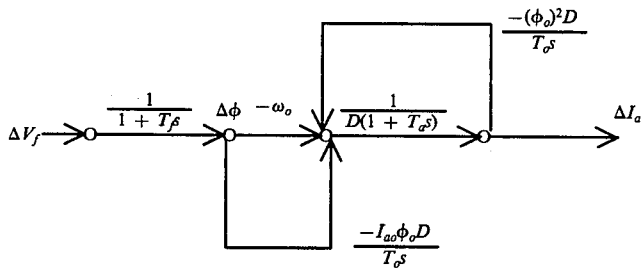

(72)

$$\frac{-I_{ao}\phi_o D}{T_\sigma s} - \omega_o = \frac{-I_{ao}\phi_o D - \omega_o T_\sigma s}{T_\sigma s}$$

(73)

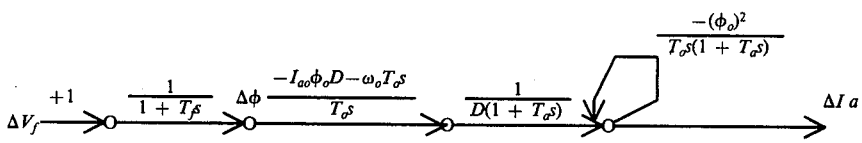

(74)

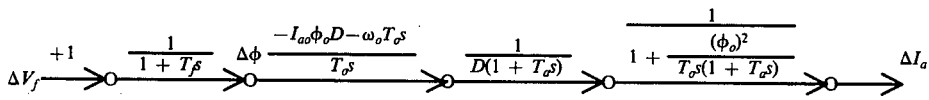

(75)

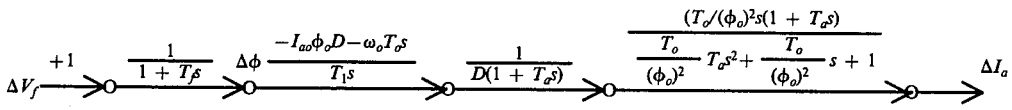

(76)

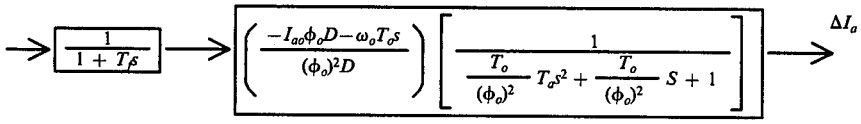

-continued

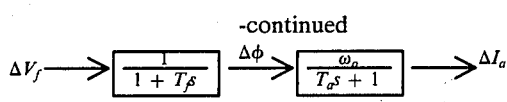

Similarly the linearized block diagram of the speed regular is:

(78)

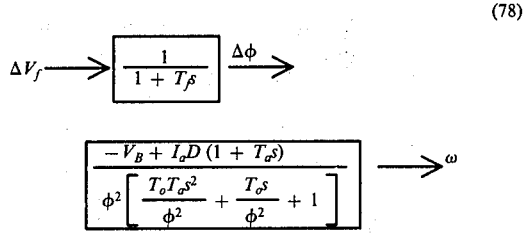

DESCRIPTION OF A PREFERRED EMBODIMENT

Referring now to FIG. 1 there is shown a d.c. motor indicated generally at 10. The armature 12 of the motor is connected to a common bus voltage. A resistor 14 connected to a current sensor circuit 16, provides the armature current signal $+\Delta I_a$. A tachometer generator 18 coupled for rotation with the armature provides speed signal $-\omega$. The field winding 20 includes an a.c. power source 22 with a current transformer 24, and a six-phase double-way thyristor circuit indicated symbolically at 26. The voltage regulator and exciter for the 6 phase thyristor converter 26 is indicated symbolically at 28. A field current sensor 30 is connected to the control transformer 24 to derive the parameter $-I_f$.

The signal $-\Delta V_f$ for controlling the field of the motor 10 is under the discipline of five controllers: a speed controller indicated generally at 32; the positive armature current limit controller indicated generally at 34; the negative armature current limit controller indicated generally at 36; the maximum field current controller indicated generally at 38; and the minimum field current controller indicated generally at 40. The input networks for the controllers are identified at: 42, 44; 48, 50; 54, 46, 60, 62; and 66, 68. The feedback networks for the controllers are identified at 46, 52, 58, 64, and 70.

The controller switching order of priority is provided through a resistor-diode switching means indicated generally at 72, and comprising resistors 74, 76, 78 and diodes 80, 82, 84 and 86 poled and connected as shown. The output of the resistor diode switching means 72 is connected to a non-inverting emitter follower indicated symbolically at 88. The gain for the five enumerated controllers is adjustable by means of potentiometers 90, 92, 94, 96 and 98 respectively.

Figure 2:
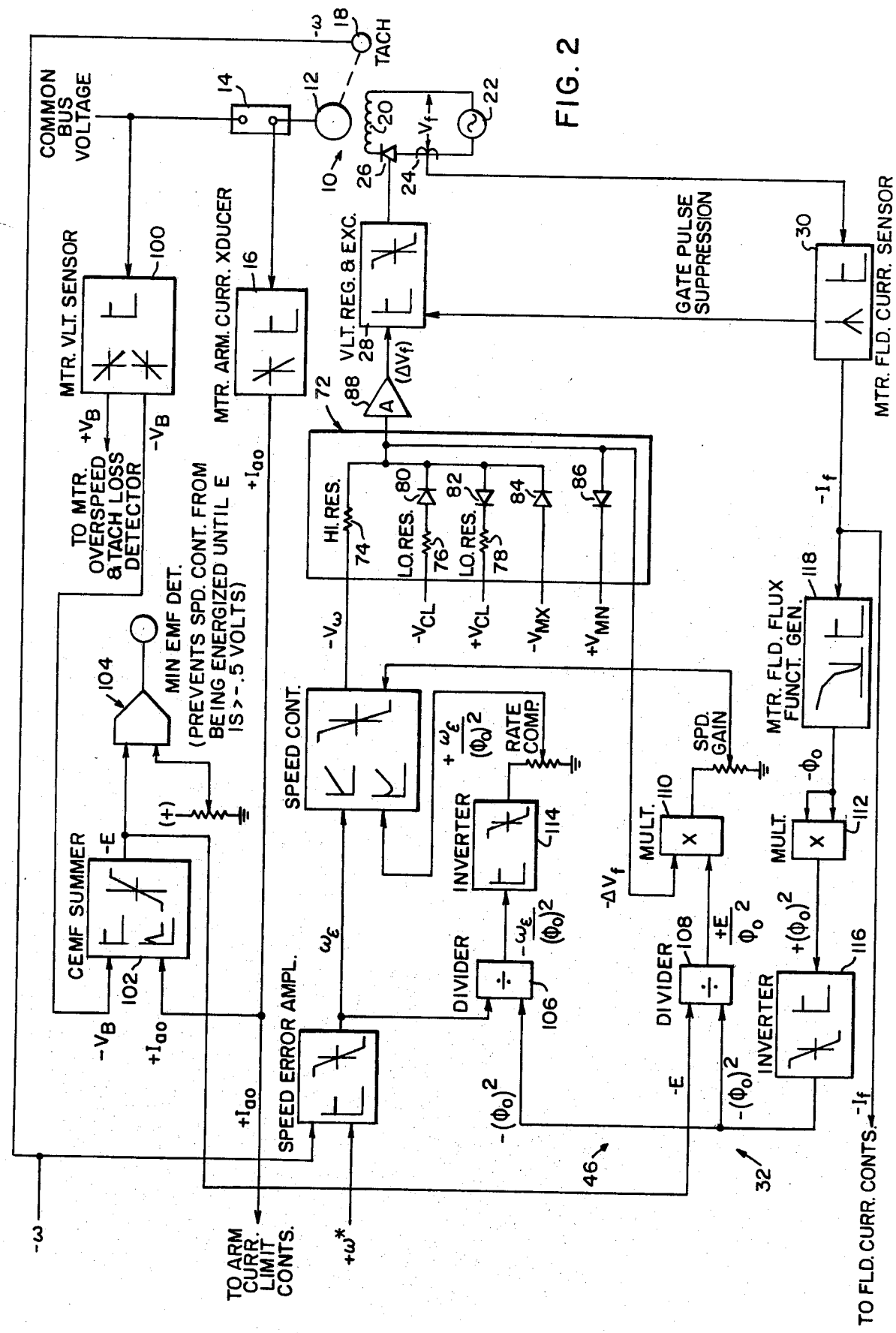
FIG. 2 is a schematic circuit diagram showing the speed controller connected with the resistor-diode selection network in accordance with the invention.

The common bus parallel speed controller is shown in greater detail in FIG. 2, which depicts how the speed signal $-V_a$ is developed for application to the resistor-diode switching means 72.

The meaning of the graphic symbols within the various boxes may be understood by referring to FIG. 9.

A motor voltage sensor 100 derives the signals $+V_B$ and $-V_B$ from the common bus resistor 14. The $+V_B$ signal is sent to the motor overspeed and tachometer loss detector (not shown); the signal $-V_B$ is applied to the counter *emf* summer 102 to develop a signal $-E$. The signal $-E$ is applied to a minimum *emf* detector, indicated generally at 104. This circuitry prevents the speed controller from being energized until $E > -0.5$ volts.

The feedback network 46 includes: dividers 106, 108, multipliers 110, 112, and inverters 114, 116. Completing the description of FIG. 2, a motor field flux function generator is indicated at 118. These units perform the indicated operations on the inputs identified in FIG. 2.

Figure 3:
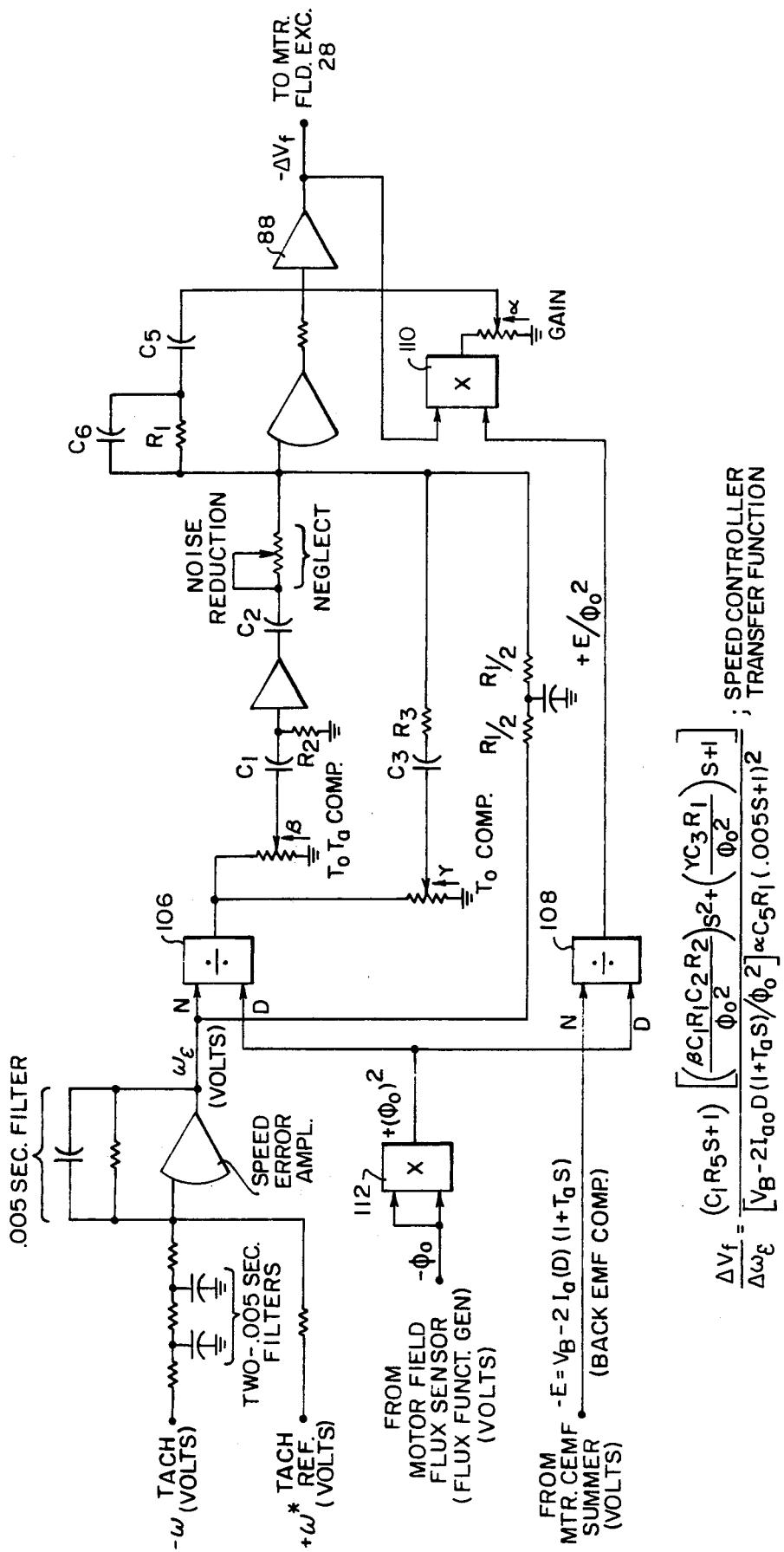
FIG. 3 is a simplified diagram showing the transfer function for the speed controller.

A simplified speed controller for the FIG. 2 circuit is shown in the transfer diagram of FIG. 3. The speed controller transfer function $\Delta V_f/\Delta \omega_e$ is shown on the drawing. In this transfer function:

$C_1 R_5$ compensates for the motor field time delay $T_f$ (secs.)

$\gamma R_1 C_3$ compensates for the mechanical time constant $T_o$ (secs.)

$\beta C_1 R_1 C_2 R_2$ compensates for the (time constant)² $(T_o T_a)$ secs $\gamma$ and $\beta$ are potentiometer adjustments $C_1 R_2 = C_3 R_3 = (R_1/4) C_4 = C_6 R_1 = 0.005$ secs (These time delays are shown by the expression $(0.005s + 1)^2$ in the denominator of the transfer function)

Figure 4:
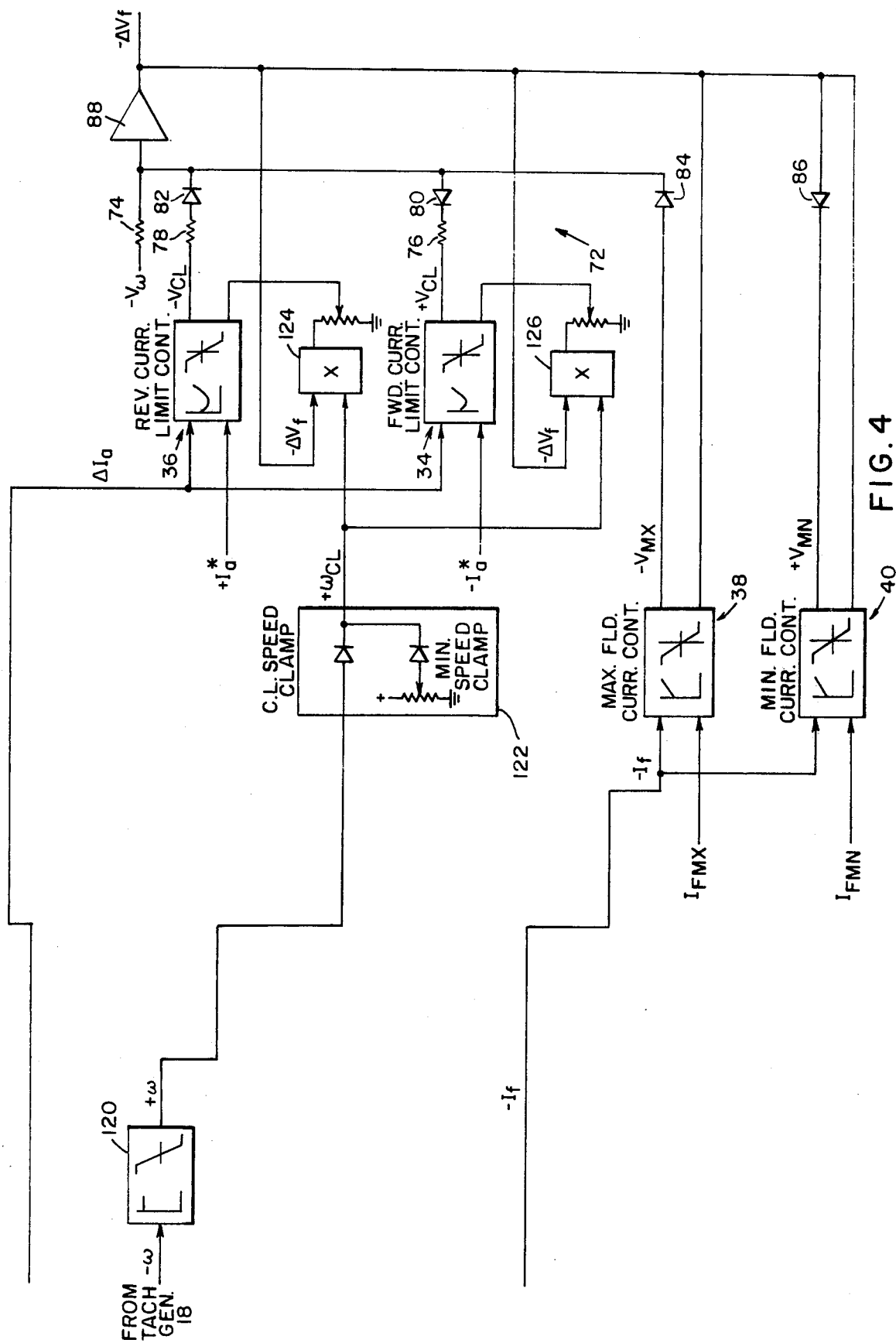
FIG. 4 is a schematic circuit diagram showing the positive and negative armature current limit controllers, and the maximum and minimum field current controllers connected with the resistor-diode selection network in accordance with the invention.

The armature current limit controllers 34, 36, and the maximum and negative field current controllers 38, 40, together with the cooperating circuitry are shown in FIG. 4. The speed signal $-\omega$ from the tachometer generator is inverted by 120 for application to a current limit speed clamping circuit 122; the output of clamp 122 i.e. $+\omega_{CL}$ is applied to multipliers 124, 126.

Figure 5:
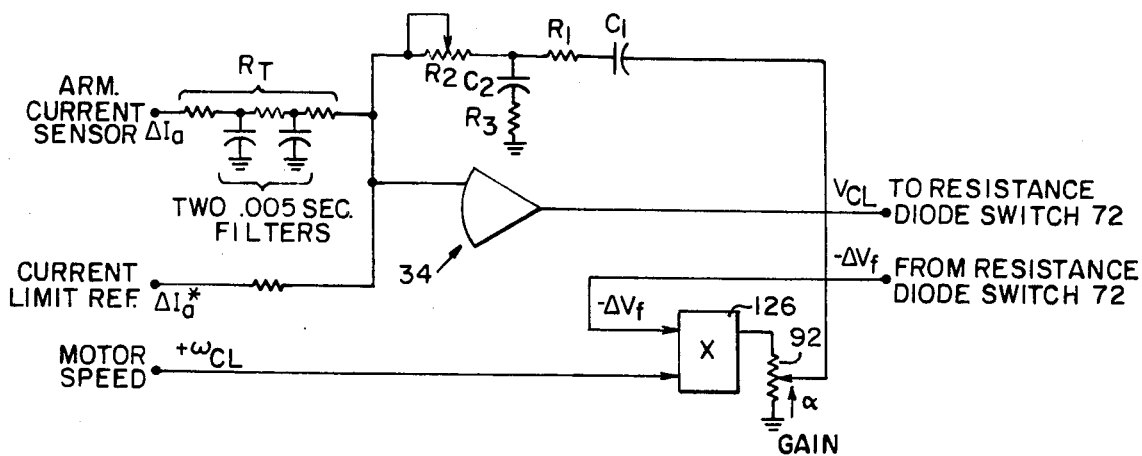
FIG. 5 is a simplified diagram showing the transfer function for the armature current limit controller.

A simplified armature current limit control for the circuit of FIG. 4 is shown in the block diagram of FIG. 5. In the transfer function shown on FIG. 5:

$R_1 C_1$ compensates for the motor field time delay sec.

$(R_2 + R_3)C_2$ compensates for the armature circuit time delay sec.

$\omega_{CL}$ compensates for the drive motor speed.

Figure 6:
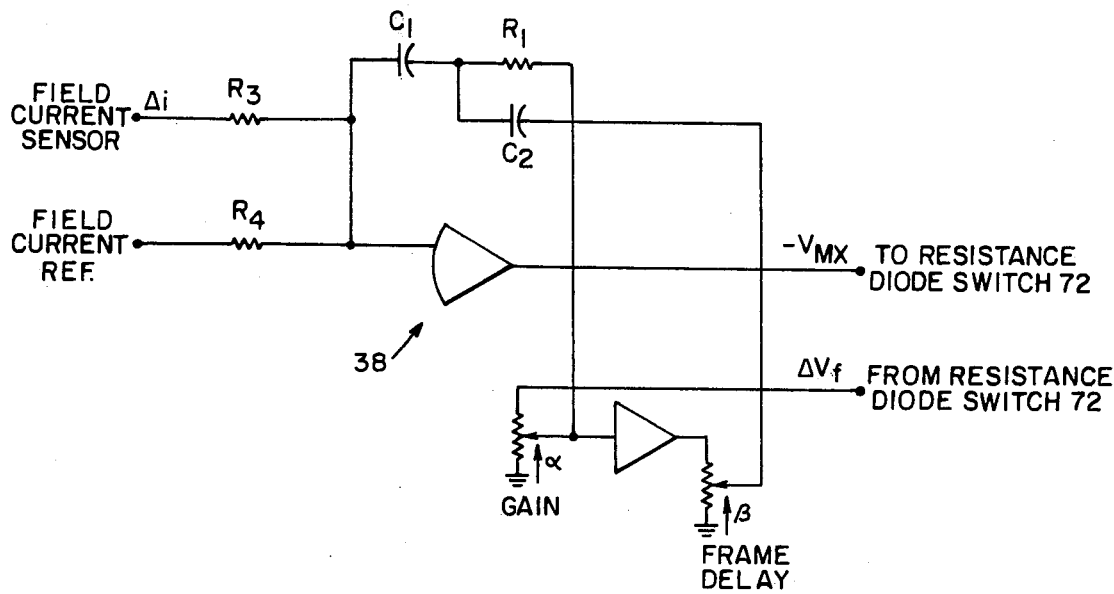
FIG. 6 is a simplified diagram showing the transfer function for the field current controller.

A simplified common bus parallel field current controller is shown in FIG. 6. The field current control transfer function is indicated on FIG. 6 where:

$R_1(C_1 + C_2)$ compensates for the motor field time delay secs $\beta C_2 R_1$ compensates for the motor frame delay secs (adjustment $\beta$ of potentiometer)

OPERATION

In all the mathematics developed it should be understood that the transfer function using $\Delta$ values is valid only for small perturbations about the operating point.

Since the speed controller is controlling the motor speed by controlling the field flux $\phi$, the relationship (transfer function) is inherently non-linear.

The invention provides an adaptive speed controller and an adaptive armature current controller wherein the inherent non-linear relationship is linearized. The term adaptive means that the time constants and gains are varied to produce a linear transfer function for the particular controller i.e. adaptive speed controller or adaptive armature current controller.

The adaptive speed controller has the transfer function shown by equation (78)

(78)

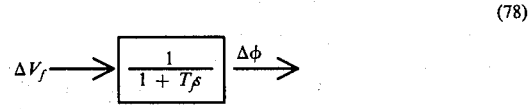

-continued $$\frac{-V_B + I_a D(1 + T_a s)}{\phi^2 \left[ \frac{T_o T_a s^2}{\phi^2} + \frac{T_o s}{\phi^2} + 1 \right]} \xrightarrow{\Delta \omega}$$

where
- $s$ = Laplace operator 1/sec
- $I_a$ = armature current per unit
- $V_B$ = bus voltage per unit
- $D$ = armature current droop per unit
- $T_o$ = mechanical time constants at rated motor field flux, seconds
- $T_a$ = armature current time constant, sec and all base values are the nameplate ratings of the motor (rated field voltage, rated field flux, rated armature current, and motor base speed.)

As may be seen from a study of equation (78) the adaptive speed controller of the invention requires that the speed controller static gain vary as:

$$\frac{\phi^2}{V_B - I_a D(1 + T_a s)}$$

This is calculated using CEMP summer 102, the motor field flux generator 118, the static multipliers 110, 112 and the static dividers 106 and 108.

The adaptive speed controller dynamic compensation requires that the speed controller rate function of $1/\phi^2$ (inverse motor field flux squared) where the rate compensation:

$$\frac{T_o T_a s^2}{(\phi)^2} + \frac{T_o s}{(\phi)^2} + 1$$

is synthesized in the speed controller input circuit. A speed controller lead time constant is also required to compensate for the motor field time delay $T_f$. The static divider 108 and the motor field flux function generator 118 calculate $1/\phi^2$.

Since the speed controller contains an integrator and three lead time constants it has PI(D)² characteristics. These are five small filter time delays (approximately 5 milliseconds each) in series with the tachometer feedback signal to reduce the high frequency gain amplification of the speed controller to tachometer noise.

The drive speed regulator cannot operate at low motor counter *emf*. Therefore the minimum *emf* detector 104 prevents the speed regulator from being energized until the motor counter *emf* has built up to a value which will permit the speed regulator to have stable operation (the static divider hardware is faithful to mathematics and the denominator cannot be zero i.e. division by zero produces infinity).

The approximate linearized block diagram for the armature current limit regulator is given by equation (77).

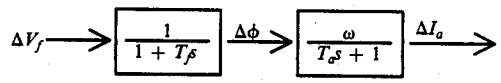

The armature current limit controllers must have PID characteristics where a lead time constant of 1 second is used to compensate for the motor field time delay $T_f$, and an adjustable lead time constant FIG. 5: $(R_2+R_3)C_2$ is used to cancel the armature circuit time delay $T_a$.

A static multiplier FIG. 5:126 has its output connected to the current limit controller gain potentiometer 92; its inputs are from the motor field exciter input control $-\Delta V_f$ and its other $\omega_{CL}$ from the drive motor tachometer. This provides motor speed compensation for the armature current limit controller. The speed signal $\omega_{CL}$ is limited to a minimum voltage level which represents about 10% motor top speed.

The field current controllers operate essentially as clamps operating between a maximum and a minimum magnitude and will not be discussed further.

The resistor diode network 72 determines the order of priority among the controller, that is the resistance between a controller output and the input to the emitter follower 88 determines which controller takes precedence. The order of priority is as follows:

a. Minimum and maximum field current controllers 40, 38, (zero resistance).

b. Armature current limit controllers 34, 36 (low resistance 4.64 K).

c. Speed controller 32 (high resistance 46.4K).

First, it should be noted that the way the diodes 80, 82, 84, 86, are arranged, when one controller is conducting, the other diode is back biased so that it is impossible for example for both the + armature current limit controller and the − armature current limit controller to be operative at the same time. Also whenever the field current controller indicates that field current control is required, it takes priority over all other controllers even if these controllers concurrently require correction of their parameter i.e. armature current speed.

A hypothetical example will serve to illustrate this concept. Suppose that the speed controller delivers an output which makes the input to the emitter follower 88, −4V, and the positive armature current limit controller 34 is delivering the maximum positive voltage +10V under these conditions diode 80 is back biased. Suppose now that in the positive armature current limit controller 34, $+\Delta I_a$ becomes greater than $-I_a^*$, then the voltage of controller 34 will start to come down from +10V; when it becomes less than −4V, diode 80 is now forward biased and it conducts. The speed controller goes to a voltage in the opposite direction i.e. saturation at +10V, and about 14 volts will be dropped across resistor 74.

What we claim is:

1. A speed regulation system for a d.c. motor operated as one of a plurality of such motors from a common voltage bus comprising:
   field exciter means for controlling the voltage supplied to the field of said motor;
   a speed regulation controller, having a linearized transfer function, connected to receive a motor speed signal $\omega$ and a motor speed reference signal $\omega^*$, and to deliver a speed control signal $-V_m$;
   an armature current limit controller, having a linearized transfer function, connected to receive an armature current signal $+\Delta I_a$ and armature current reference signals $\pm I_a^*$ and to deliver an armature current control signal $\pm V_{C.L.}$;
   switching means for determining priority among said controllers, said controllers being connected in parallel to said switching means, said switching means delivering an output signal $-\Delta V_f$ to said field exciter means which is a function of the output of one selected controller, based on the order of priority: (1) field current controller, (2) armature current limit controller, (3) speed controller.

2. A speed regulation system according to claim 1 wherein said linearized speed regulation controller has a linear block diagram:

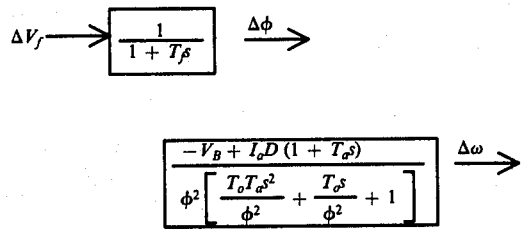

where
$\Delta V_f$ = incremental field voltage (per unit)
$T_f$ = motor field time delay constant/sec.
$s$ = Laplace operator, 1/sec
$\Delta \phi$ = incremental motor field flux (per unit)
$V_B$ = bus voltage per unit
$I_a$ = armature current per unit
$D$ = armture current droop per unit
$T_a$ = armature current time constant/sec.
$T_o$ = mechanical time constant at rated motor field flux/sec.
$\phi$ = motor field flux
$\Delta \omega$ = incremental motor speed (per unit)

3. A speed regulation system according to claim 1 wherein said linearized current limit controller has a linear block diagram:

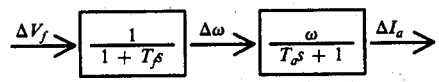

where
$\Delta V_f$ = incremental motor field voltage (per unit)
$T_f$ = motor field time delay constant/sec.
$s$ = Laplace operator 1/sec.
$\Delta \phi$ = incremental motor field flux (per unit)
$\omega$ = motor speed
$T_a$ = armature current time constant/sec.
$\Delta I_a$ = incremental motor armature current (per unit)

4. A speed regulation system according to claim 1 wherein said switching means is a selection network comprising resistors and diodes, said resistors being in series with the output of said controller respectively, the magnitude of said series resistors reflecting the order of priority of the controllers respectively, said diodes being connected in the outputs of said controllers and being poled so that when a priority selected controller is developing its control signal, the diodes in the outputs of the remaining controllers are blocked.

5. A speed regulation system according to claim 1 wherein an emitter follower amplifier is inserted between the output of said switching means and said field exciter means.

* * * * *